Jan. 23, 1962 E. M. LEYTON ETAL 3,018,324

STABILIZATION IN TAPE RECORDING AND REPRODUCTION

Filed July 25, 1958 2 Sheets-Sheet 1

INVENTORS
ERIC M. LEYTON &
GEORGE A. OLIVE
BY W. H. Sprague
ATTORNEY

STABILIZATION IN TAPE RECORDING AND REPRODUCTION

Filed July 25, 1958 2 Sheets-Sheet 2

INVENTORS
ERIC M. LEYTON &
GEORGE A. OLIVE

BY
ATTORNEY

United States Patent Office 3,018,324

Patented Jan. 23, 1962

3,018,324

STABILIZATION IN TAPE RECORDING AND REPRODUCTION

Eric M. Leyton, Princeton, and George A. Olive, Lawrenceville, N.J., assignors to Radio Corporation of America, a corporation of Delaware Filed July 25, 1958, Ser. No. 751,063
10 Claims. (Cl. 178—5.4)

This invention relates to improvements in electrical signal processing systems and, more particularly, to a system for inserting a new color synchronizing burst in a composite color television signal to correct for any deterioration that may have occurred to the old color synchronizing burst.

In color television systems, the periodic color synchronizing burst is often substandard for a number of reasons. For one, the composite color television signal may have poor bursts due to noise introduced during transmission and processing. If the composite signal is transmitted with such weak or distorted burst, home television receivers would have some difficulty in reproducing accurately the color components of the image represented by the signal.

Another source of color synchronizing burst distortion is magnetic tape recording systems. The bursts may be damaged by defects on the surface of the magnetic tape or by unwanted tape movement variations. To obtain accurate recording and reproduction in magnetic tape recording systems, the relative motion between those areas on the recording medium containing the recorded representations and the transducing means must remain the same during recording as during playback. If the relative motion does not remain the same, the recovered color television signal becomes phase-modulated with the unwanted tape motion variations and this produces hue changes in the colors of the reproduced picture on a home color receiver.

One method of correcting for the effects of non-uniformity in tape motion is by the so-called heterodyning technique of the type described in a copending patent application of Eric M. Leyton, entitled "Recording and Reproducing System," Serial No. 687,827, filed October 2, 1957, now U.S. Patent No. 2,979,558, issued April 11, 1960.

As described in the said Leyton application, information is impressed on a movable storage medium as the phase modulated components of a carrier wave. On playback, a reference signal bearing a fixed timing relation to the recorded carrier wave is derived from the recovered recorded information. This derived reference signal thus is phase modulated with any error information introduced onto the recorded signal by irregular motions of the recording and reproducing process. Means are then provided for heterodyning the recovered phase modulated components of the carrier wave with the derived reference signal so that the original information effectively modulates a new carrier wave correctly and is free of errors attributable to the irregular motion of the storage medium.

In accordance with a preferred form of the said Leyton invention, use is made of the fact that the above noted unwanted phase changes or variations in the color subcarrier of a composite color television signal are usually slow enough so that the magnitude of the change during a given horizontal line interval is small enough to be tolerable. The derived reference signal is obtained from the recovered color synchronizing burst which drives a discontinuous type of oscillator which is independent of its previous condition and whose output has a phase determined solely by the last color reference burst signal received from the playback signal. Such derived reference signal source may be a so-called "start-stop" oscillator which is resettable during the burst interval to change its phase to that of the recovered burst. In this manner the recovered color subcarrier may be separated from the composite color signal and applied along with a standard reference signal source to the heterodyne apparatus to compensate for the effect on the color subcarrier of any timing variations which may occur from line to line in the playback signal. The corrected color components are then recombined with the luminance and synchronizing components to reform the composite television signal now substantially free of the effects of tape velocity variations.

Use of this heterodyning apparatus unfortunately tends to restrict the bandwidth of the chrominance signal and therefore rounds off the burst somewhat. Also, since the heterodyne color apparatus processes each burst using the start-stop oscillator which has just been resynchronized, by virtue of the fact that the start-stop oscillator requires a finite time to settle down after each resynchronization, the phase of the burst may be in error.

Thus it is seen that the burst in a color television signal may become distorted in the normal course of its transmission and distribution, or as a result of the heterodyning correction applied to a magnetic tape recorded signal. In either event, such burst distortion makes it highly desirable of providing apparatus for regenerating the burst in a color television signal prior to transmission thereof. Previous attempts to regenerate the burst have been directed along the lines of synchronizing a new color subcarrier source with the recovered burst information. Such method is unsatisfactory since if one burst falls out of its normal phase relationship with the color television signal, the synchronized burst oscillator may be thrown out of phase for the duration of several horizontal line intervals.

It is therefore an object of the present invention to provide an improved color television signal processing system for correcting errors in the burst synchronizing components of the color television signal.

Another object of the present invention is to provide an improved system for inserting a new color synchronizing burst signal into a composite color television signal.

A further object of the present invention is to provide an improved system for correcting the hue representations of an image existing in a composite color television signal.

In accordance with the invention, a composite color television signal to be corrected is passed through a heterodyne color corrector. The heterodyne color corrector, in effect, removes the color information from the incoming color subcarrier and places it on a new color subcarrier. The new color subcarrier is derived from a standard color subcarrier reference source which provides a continuous wave signal having a frequency of approximately 3.48 megacycles (mc.) per second. The old color synchronizing burst, which is often incompletely processed due to the normal lag time of the start-stop oscillator in the heterodyne color corrector, is removed from the composite color television signal. By the use of the heterodyne color corrector, it is possible to gate a new color synchronizing burst from the stable continuous wave signal source and add the gated burst to the composite color signal from which the old burst was removed.

In this manner, a stable color synchronizing burst source is continuously available and of the correct phase even though an incoming burst may be missing. Further, by adjusting the phase of the reference source signal prior to gating and adding to the composite signal, the hue representations noted by the composite color signal are readily adjustable.

The novel features of this invention as well as the invention itself, both as to its organization and method of operation, will best be understood from the following description, when read in connection with the accompanying drawings, in which like reference numerals refer to like parts and in which.

Figure 1:
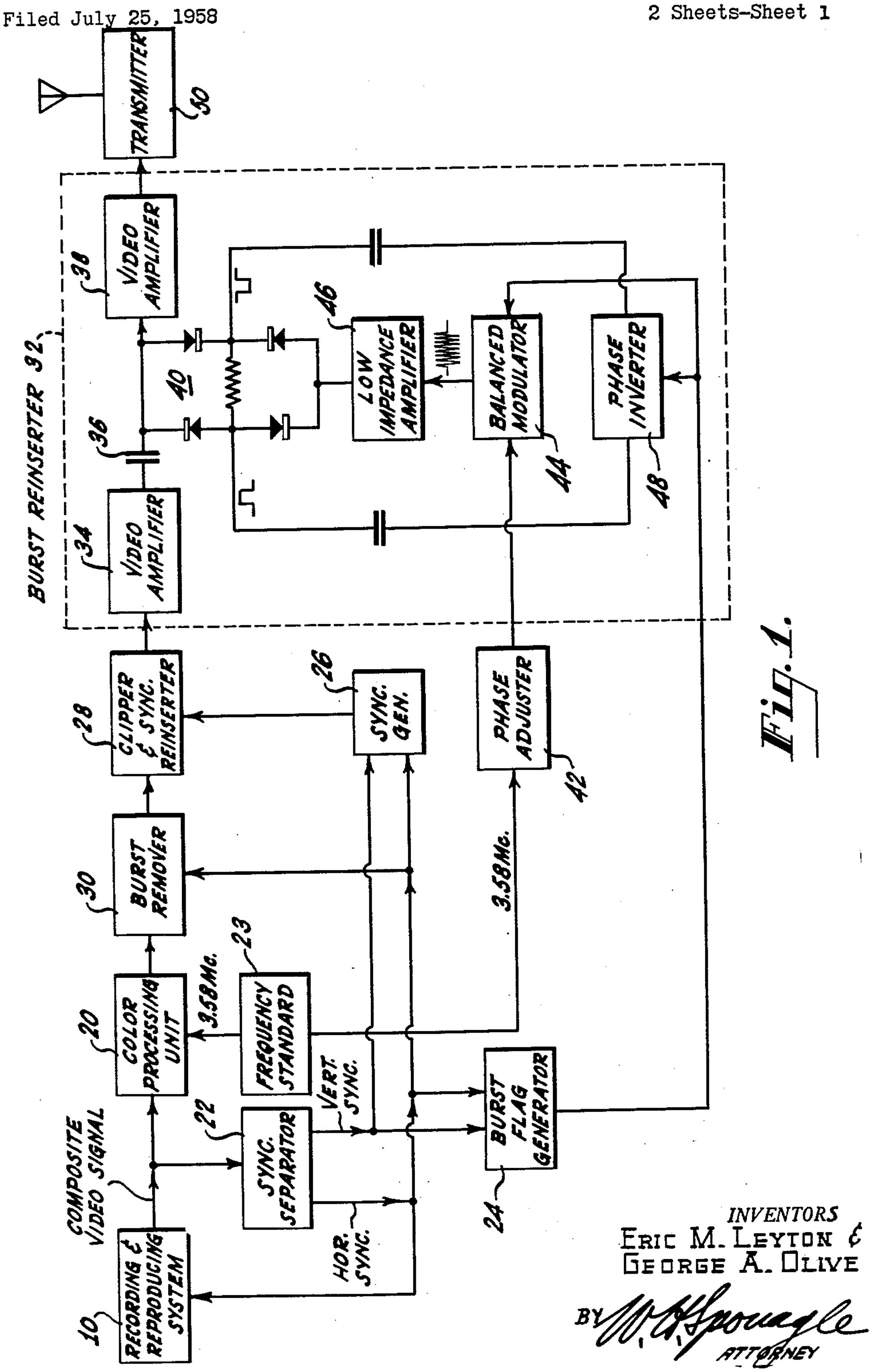
FIGURE 1 is a block diagram illustrating the invention.

In the drawings of the invention, the ground symbols associated with the several blocks illustrated therein have been omitted for the sake of clarity. However, such ground symbols may be assumed as being present where necessary to provide proper operation for the circuit elements illustrated in the drawings. In FIGURE 1 there is illustrated a source of composite color television signals 10 which may, for example, be a magnetic tape recording and reproducing system of the type described in the said Leyton application. The tape recording and reproducing system may be of the lateral scan type described in the said Leyton application wherein the information is recorded on magnetic tape on tracks that are transverse to the direction of tape motion, that is, across the width of the tape. Alternatively, the tape recording and reproducing system may be of the longitudinal type wherein the information is recorded on longitudinal tracks, that is, tracks that extend along the length of the tape.

In any event, the signal derived from the tape system 10 is a composite color television signal including luminance components, chrominance components, color synchronizing burst components, and deflection synchronizing components. The composite video signal is applied to a heterodyne color processing unit 20, the details of which are set forth fully in FIGURE 3 and even more fully in the said Leyton application. The heterodyne unit 20, as noted above, removes the color phase errors from the modulated color subcarrier. Actually the heterodyne unit 20 effectively places the chrominance components of the recovered color video signal on a new color subcarrier, namely the stable subcarrier obtained from a 3.58 mc. frequency standard 23. The frequency standard 23 may be the crystal controlled station standard. The recovered composite color television signal is also coupled to a sync separator 22 which may be of a conventional type for separating the deflection synchronizing components into separate horizontal and vertical synchronizing signals.

The horizontal synchronizing signal is coupled back to the recording and reproducing system 10 to aid in controlling the tape speed and the head switching rate when a lateral scan system is employed. The vertical and horizontal sync signals from the sync separator 22 are passed to a burst flag generator 24 and to a sync generator 26. The function of the burst flag generator 24 is to provide a suitably timed keying signal commonly known as a burst flag pulse for selectively controlling the combination of reference bursts of the color subcarrier with the primary video signals in the studio prior to transmission. Any suitable burst flag generator may be employed. One typical burst flag generator is described, for example, on page 288 of the book "Color Television Engineering" by John W. Wentworth (McGraw-Hill, 1955).

Figure 2:
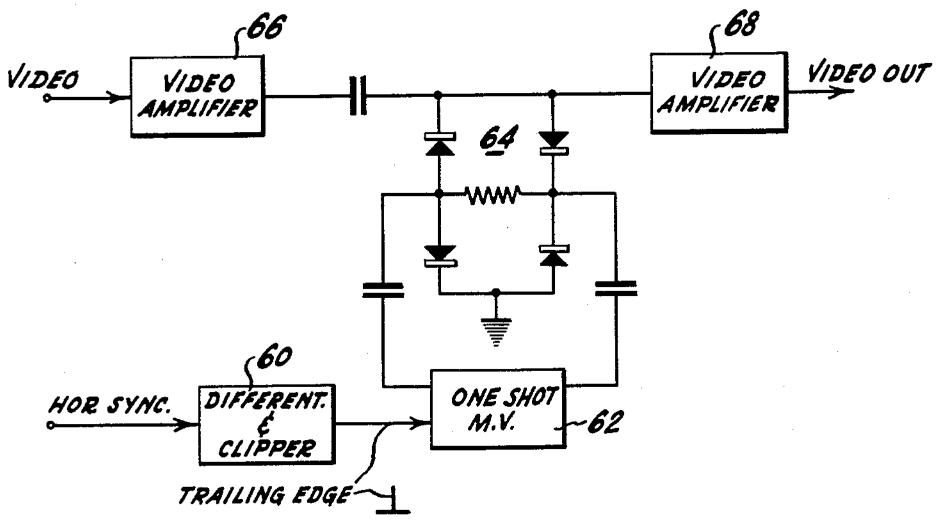
FIGURE 2 is a partial block and partial schematic diagram of suitable apparatus which may be employed for the burst remover block of FIGURE 1.

The sync generator 26 acts to "clean up" the recovered horizontal and vertical sync signals from the sync separator 22 and recombine them to form a composite sync signal which may then be added to the reformed video color signal by a clipper (which removes the old sync) and sync reinserter circuit 28 which may be of conventional design. The phase corrected video color signal from the heterodyne color processing unit 20 has its burst removed by a burst remover 30. A suitable burst remover, which may be a gated clamp circuit, is illustrated in FIGURE 2 and is actuated by the trailing edge of the horizontal sync pulses obtained from the sync separator 22. The phase corrected color video signal is next passed through the clipper and sync reinserter 28 wherein new sync from the sync generator 26 is added.

After such processing, the only remaining operation required is that of burst reinsertion which is performed by a burst reinserter 32. In its simplest form, the burst reinserter 32 may generate a new burst from the continuous wave signal of the frequency standard 23, which is passed through a phase adjuster 42, by means of a balanced modulator the output of which is added to the video signal. Alternatively, the new burst may be added by an arrangement of diodes that is similar to a clamp circuit. The continuous wave signals from the frequency standard 23 are fed to the bottom of the clamp circuit while the burst flag from the burst flag generator 24 is used as the clamping pulse. This arrangement has the additional advantage of attenuating any of the old burst which may have passed through the burst remover 30 simultaneously while inserting the new burst.

An improved form of burst reinserter is illustrated in the dotted area 32. In this arrangement, a burst signal gated by a conventional balanced modulator 44 is applied to the bottom of the clamp 40 instead of a continuous wave signal from the frequency standard 23. The reformed color video signal from the clipper and sync reinserter 28 is thus passed through a video amplifier 34, the capacitor 36, and a second video amplifier 38. At the point between the input capacitor 36 and the input of the video amplifier 38, a conventional gated diode clamp circuit 40 is connected. Thus, the balanced modulator 44, actuated by a burst flag pulse from the burst flag generator 24, passes bursts of the 3.58 mc. carrier wave from the frequency standard 23 through the low impedance amplifier 46 to the bottom of the diode clamp 40. The clamp 40 is gated by the burst flag pulses which have been passed through a phase splitter to provide positive and negative (phase and paraphase) gating signals in response to each burst flag pulse. Since the output from the balanced modulator 44 is coupled to the low impedance amplifier 46, the clamp 40 effectively clamps the reformed video signal to the new burst signal. In this manner, any of the old burst which is present on the reformed color video signal after passage through the burst remover 30 is further attenuated while at the same time the new burst is being added to the reformed color video signal. After the new burst is inserted, the reformed and now composite color television signal is passed to a conventional transmitter 50 for transmission.

In this manner, by passing the recovered video signal through a heterodyne color processing unit 20, wherein the color components contained in the composite signal are effectively placed on a new color subcarrier derived from the frequency standard 23, it is now possible to gate into the composite signal new burst components that are derived from the frequency standard 23. The inserted bursts are stable since they are derived from a source (e.g. a crystal controlled oscillator) which does not vary at a rate greater than a home television receiver is capable of following. Also, by adjusting the phase of the continuous wave signal from the frequency standard 23 relative to that applied to the heterodyne color processing unit 20, the hue of the colors represented by the composite video signal may be modified to correct for any discrepancies which may exist therein.

In FIGURE 2, a suitable circuit for the burst remover 30 of FIGURE 1 is illustrated in detail. The horizontal sync signals from the sync separator 22 (FIGURE 1) are coupled to a differentiator and clipper 60 which provides a single positive-going pulse corresponding to the trailing edge of the horizontal synchronizing pulse. This pulse is applied to and triggers a monostable (one-shot)

multivibrator 62 which provides both positive and negative (phase and paraphase) pulses that actuate a clamping circuit 64. The clamping circuit may be a conventional diode type gated clamp circuit which, when actuated, clamps a given point in a circuit to a reference potential, in this instance, ground. Thus, the reformed video signals from the color processing unit 20 (FIGURE 1), coupled through video amplifiers 66, 68, are clamped to ground for the duration of the burst interval. The gating or clamping pulses from the one-shot multivibrator 62 are adjustable in length to cover this burst interval. The length of the gating pulses may be adjusted by varying the circuit parameters of the multivibrator or by other well-known techniques.

Figure 3:
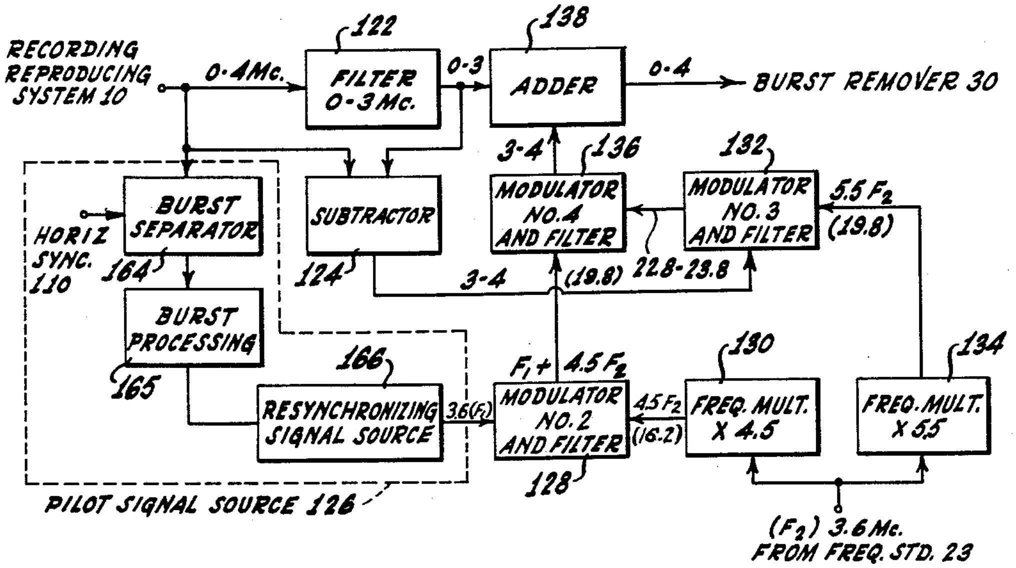
FIGURE 3 is a block diagram of the color processing unit of FIGURE 1 which is one form of the heterodyne color corrector described in the said Leyton application.

Refer now to FIGURE 3 for a description of the detailed construction and operation of the heterodyne correcting or color processing unit 20 (FIGURE 1), which is of the type described by the said Leyton application. In FIGURE 3, the composite video signal is applied to a 0 to 3 mc. band pass filter 122, a subtractor 124, and a burst separator 164. The burst separator 164 gated by the horizontal sync pulses from the sync separator 110 separates from the composite signal the color reference or synchronizing burst signal occurring at the beginning of each horizontal line and passes it through a burst processing circuit 165. In this circuit the positive and negative portions of the color reference burst signal are each clipped and amplified so that a color reference signal is obtained that is substantially free of switching transients and other noise information which may be present. The separated color burst, so processed, is now applied to the input of a resynchronizing signal source 166 such as a start-stop oscillator, a suitable circuit for which is described in the said Leyton application. Briefly, the start-stop oscillator described in the Leyton application is a Hartley oscillator with the cathode of the oscillator tube across the tank circuit of the oscillator. Also across the tank circuit is a cathode of a second tube which is normally cut off. The grid of the second tube is driven by the burst during the time the burst is present. The second tube is caused to conduct during the positive going part of the burst. The conduction of the second tube damps the oscillator, and the current flowing through the second tube in phase with the burst synchronizes and drives the tank circuit with the burst. Upon the completion of the burst, the oscillator oscillates freely with the initial phase determined by the burst.

The resynchronizing signal source 166 generates a reference color subcarrier signal which is synchronized as to its phase with the phase of the regularly recurring color reference burst from the burst processing circuit 165. More specifically, the resynchronizing signal source is a circuit capable of changing its phase substantially instantaneously druing the burst interval to that of the color reference burst present in the played back video signal at the beginning of each horizontal line of television information. The resynchronizing signal source 166 provides a reference signal, stable for the duration of one horizontal line, but phase modulated by the same unwanted error information as the color subcarrier that is present at the beginning of each line. The tape recording systems available today have sufficient stability such that any distortions or other variations occurring during the interval of one horizontal television line are relatively insignificant. The burst separator 164, burst processor 165, and resynchronizing signal source 166 constitute a pilot or reference signal source 126.

Other types of pilot signal sources 126 may be used than those having a resynchronizing signal source of the type described in said Leyton application. For example, the resynchronizing signal source may be a ringing circuit that is shock excited with each color reference burst. The ringing circuit has a Q that is sufficiently high to sustain the shock excited oscillations for the duration of one horizontal line. A clipper may maintain the amplitude of the oscillations at a constant level.

In the heterodyne correcting system of FIGURE 3, the output of the reference signal source 126 is passed to one input of a second modulator and filter 128. The output from the reference signal source 126 has a nominal frequency value of 3.6 megacycles (the color subcarrier frequency rounded off for convenience), which is designated as frequency $F_1$ and which is phase modulated with the same error information (corresponding to the beginning of each horizontal line) as the composite video signal from the recording and reproducing system 10 (FIGURE 1). The second modulator 128 may be any suitable type of amplitude modulator capable of producing the sum and difference cross modulation products between two input frequencies. The other input of the second modulator and filter 128 is a multiple of the stable frequency of approximately 3.6 mc. from the frequency standard 23 (FIGURE 1), designated as frequency $F_2$, but multiplied by a multiplier 130 by the factor of 4.5 so that the frequency applied to the second modulator 128 is approximately 16.2 mc. (4.5 $F_2$). The filter associated with the second modulator 128 is designed to pass the upper sideband frequencies (19.8 mc.), which is the summation of the two input frequencies ($F_1$+4.5 $F_2$) to the second modulator 128. The output of the second modulator 128 is, therefore, also phase modulated in the same manner as the reference signal frequency $F_1$ with any errors in tape speed, head position, etc. that may occur during the recording and reproducing process.

The subtractor 124 connected across the 0–3 mc. filter 122 is designed so that it gives no output for those frequencies that are transmitted by the filter but gives an output for all the frequencies that are not passed by the filter; namely, the color information and the higher frequency components of the brightness information in the 3–4 mc. range. As noted previously, the color subcarrier, which carries the color information, is modulated not only with the required color information but is also phase modulated with the error in head position, errors due to tape stretching, errors due to differences in speed between the playback and recording processes, as well as other intermittent errors arising during recording and playback processes. The reference signal obtained from the pilot signal source 126, which employs the resynchronizing signal source 166, is also phase modulated with the error existing at the time of the occurrence of each preceding burst in the recovered composite video signal. The output from the subtractor 124 is then passed to one input of a third modulator and filter 132. The other input to the third modulator and filter 132 is a frequency signal 5.5 $F_2$ (19.8 mc.) which is derived from a frequency multiplier 134, which multiples the 3.6 mc. signal $F_2$ derived from the frequency standard 23 (FIGURE 1) by the factor of 5.5. The filter of the third modulator 132 is arranged to select the upper sidebands of the modulation products which will be in the range of 22.8 to 23.8 mc. (employing the frequencies assumed by way of illustration).

The color subcarrier recovered from the tape with all its wanted and and unwanted modulation components, therefore, appears at the ouput of the third modulator 132 but is increased in frequency by an amount equal to 5.5 $F_2$. This signal is then passed to a fourth modulator and filter 136 along with the output signal from the second modulator 128 bearing the derived reference signal. The filter of the fourth modulator 136 is designed to select the difference frequencies of the modulation products. In this manner the derived reference signal (increased in frequency to 4.5 $F_2$) is subtracted from the recovered subcarrier information (increased in frequency to 5.5 $F_2$). Since the errors occurring in the magnetic tape recording and reproducing system change very little over the period of a horizontal television line, the derived pilot signal from the pilot signal source 126 is effectively modulated with the same error information as is the signal from the third modulator 132. By so subtracting these two signals, the output from the fourth modulator 136 contains little or none of the unwanted information. Nor does the output from the fourth modulator 136 contain any of the recovered color subcarrier frequency but will contain the new stable color subcarrier frequency $F_2$ from the frequency standard 23 (FIGURE 1), which is modulated in both phase and amplitude with the desired correct color information. This high frequency information is then added to the lower frequency brightness information in an adder 138 and is then passed to the burst remover 30 (FIGURE 1).

The frequencies employed in the above example have been quite satisfactory in operation but are given by way of example only. Other frequencies, of course, may be employed to suit the individual needs of the user. The only requirement for the heterodyning system is that the reference signal, phase modulated with substantially the same error information as the color subcarrier, be subtracted from the color subcarrier increased in frequency by an amount equal to a new desired subcarrier.

Note that the color processing unit 20 tends to correct the color reference burst signals. Since the pilot signal source 126 (FIGURE 3) may not instantly stabilize itself to the phase of each new recovered burst signal, and, in fact, does require a finite time to change the phase of its output signal during this change period, the burst may be distorted by the color processing unit 20. Thus by removing the burst by the burst remover 30 and reinserting a new stable burst by the burst reinserter 32, the problem is obviated.

There has thus been described a rather simple method by which a new color burst may be inserted into a composite color television signal. The burst reinserter finds primary usage in conjunction with a video tape recorder wherein a heterodyne color corrector is employed to correct the chrominance portion of the reproduced color television signal for effects due to tape speed variations.

What is claimed is:

1. In a color television system for processing a composite color television signal, said composite signal including a color subcarrier synchronously modulated in phase and amplitude by chrominance information, a burst color synchronizing component, a luminance component, and a deflection synchronizing component, the combination of a source of a new color subcarrier signal having the same frequency as said color subcarrier, heterodyning means responsive to said burst color synchronizing component and to the new color subcarrier signal derived from said source for effectively removing said chrominance information from said color subcarrier and effectively modulating said new color subcarrier therewith thus reforming said composite color television signal, burst removing means coupled to the output of said heterodyning means for removing said burst color synchronizing component from said reformed composite color television signal, and means coupled to said burst removing means and to said new color subcarrier source for adding bursts of said new color subcarrier to said reformed composite color television signal from which said burst color synchronizing component has been removed.

2. The system claimed in claim 1 wherein said heterodyning means includes a synchronized oscillator coupled to receive said burst color synchronizing components and to provide in response thereto a reference signal having a phase and frequency that is time locked to said burst color synchronizing component, a first modulator means for heterodyning said reference signal with a first standard signal that is a first multiple of said new color subcarrier frequency, a second modulator means for heterodyning said modulated color subcarrier with a second standard signal that is a second multiple greater by one than said first multiple of said new color subcarrier frequency, a third modulator means for heterodyning the outputs of said first and second modulator means together to obtain the difference frequencies therebetween which is a signal having the same frequency as said color subcarrier and being phase and amplitude modulated by said chrominance information.

3. In a color television system for processing a composite color television signal, said composite signal including a color subcarrier synchronously modulated in phase and amplitude by chrominance information, a burst color synchronizing component, a luminance component, and deflection synchronizing component, the combination of a source of a new color subcarrier having the same frequency as said color subcarrier, heterodyning means responsive to said burst color synchronizing component and to the new color subcarrier derived from said source for substituting said new color subcarrier for said color subcarrier to thereby reform said composite color television signal, burst removing means coupled to the output of said heterodyning means for removing said burst color synchronizing component from said reformed composite color television signal, means responsive to said deflection synchronizing component for generating a burst flag signal, and means responsive to said burst flag signal and to said new color subcarrier derived from said source for inserting a new burst color synchronizing component into said composite color television signal that is stable and bears a predetermined phase relation to said new color subcarrier.

4. The system set forth in claim 3, wherein said new burst color synchronizing component inserting means includes means for shifting the phase of the new burst color synchronizing component relative to said new color subcarrier whereby the hue of color images obtained from said reformed composite color television signal is changed in accordance with said phase shift of said new burst color synchronizing component.

5. The system set forth in claim 3 wherein said new burst color synchronizing component inserting means comprises a balanced modulator which provides an output signal having the frequency of said new color subcarrier derived from said source and which is actuated by a modulating signal, said modulating signal being said burst flag signal.

6. The system set forth in claim 3 wherein said new burst color synchronizing component inserting means comprises a balanced modulator coupled to said source and to said burst flag generating means for modulating the new color subcarrier frequency signals by said burst flag signal to produce said new burst color synchronizing component at the output of said balanced modulator, a gated clamping circuit having a gating signal input and a reference signal input, said reference signal input being coupled to said balanced modulator output, said gating signal input being coupled to said burst flag signal generating means, said gated clamping circuit being adapted to clamp said reformed composite color television signal to said new burst color synchronizing component.

7. The system set forth in claim 3 wherein said new burst color synchronizing component inserting means includes gated clamping means for clamping said reformed composite color television signal to said burst color synchronizing component in response to gating signals derived from said burst flag signal generating means.

8. In a system for recording on and reproducing from a magnetic tape a composite color television signal, said composite color television signal including a color subcarrier synchronously modulated in phase and amplitude by chrominance information, a burst color synchronizing component, a luminance component, and a deflection synchronizing component, said system comprising means for reproducing said composite signal from said magnetic tape, said magnetic tape and said reproducing means causing phase and frequency variations to occur in said reproduced composite signal, means coupled to said reproducing means and controllable substantially instantaneously upon receipt of each said reproduced burst color synchronizing components for providing a reference signal having the phase and frequency of said recovered burst color synchronizing component, a source of a wave having a given frequency the same as that of said color subcarrier, means for receiving said reference signal and said given frequency wave from said source for producing the sum frequency of said given frequency wave and said reference oscillations, and means for receiving said reproduced modulated color subcarrier and said sum frequency for producing the difference frequencies between said recovered modulated color subcarrier and said sum frequency, and means coupled to said difference frequency means and to said reproducing means for reforming said reproduced composite signal whereby said phase and frequency variations occurring in said reproduced composite signal are substantially eliminated from said reformed composite signal, the combination of: means responsive to said reforming means and to said reproduced synchronizing components for removing said reproduced burst color synchronizing component; and means coupled to said wave source for reinserting in place of said removed burst color synchronizing component a burst of said given frequency wave.

9. In a system for recording and reproducing composite signals by means of a movable storage medium, said composite signal including a carrier wave phase modulated with information and reference frequency signals phase locked to said carrier wave, said system comprising means for reproducing said composite signal from said movable storage medium, said reproduced composite signal subject to being phase modulated by irregularities in the relative movement of said medium with respect to said recording and reproducing means, means coupled to said reproducing means for deriving a reference signal having the same frequency and being phase locked to said reproduced carrier wave and being phase modulated with said irregularities in the relative movement of said medium, a source of an oscillatory wave, means coupled to said source and to said reference signal deriving means for producing a wave having the frequency of said oscillatory wave and said derived reference signal, and means coupled to said sum frequency wave producing means and to said reproducing means for producing the difference frequencies between said sum frequency and said reproduced carrier wave, said difference frequencies corresponding to the original said phase modulated carrier wave free of the effects of said irregularities in the movement of said medium with respect to said recording and reproducing means, the combination of: means coupled to said oscillatory wave source for substituting new reference frequency signals phase locked to said oscillatory wave for the original reference frequency signals phase locked to the carrier wave.

10. The combination set forth in claim 9 wherein said reference frequency signals include periodic bursts of said reference frequency and wherein said substituting means includes a balanced modulator.

References Cited in the file of this patent

UNITED STATES PATENTS 2,772,324 Boothroyd ------------ Nov. 27, 1956

UNITED STATES PATENT OFFICE

CERTIFICATE OF CORRECTION

Patent No. 3,018,324 January 23, 1962

Eric M. Leyton et al.

It is hereby certified that error appears in the above numbered patent requiring correction and that the said Letters Patent should read as corrected below.

Column 1, line 45, for "1960" read -- 1961 --; column 2, line 56, for "3.48" read -- 3.58 --; column 10, line 9, after "the" insert -- sum --.

Signed and sealed this 29th day of May 1962.

(SEAL)
Attest:

ERNEST W. SWIDER
Attesting Officer

DAVID L. LADD
Commissioner of Patents